A. QUIROLO.
Steroscope.
No. 52,744.
Patented Feb. 20, 1866.
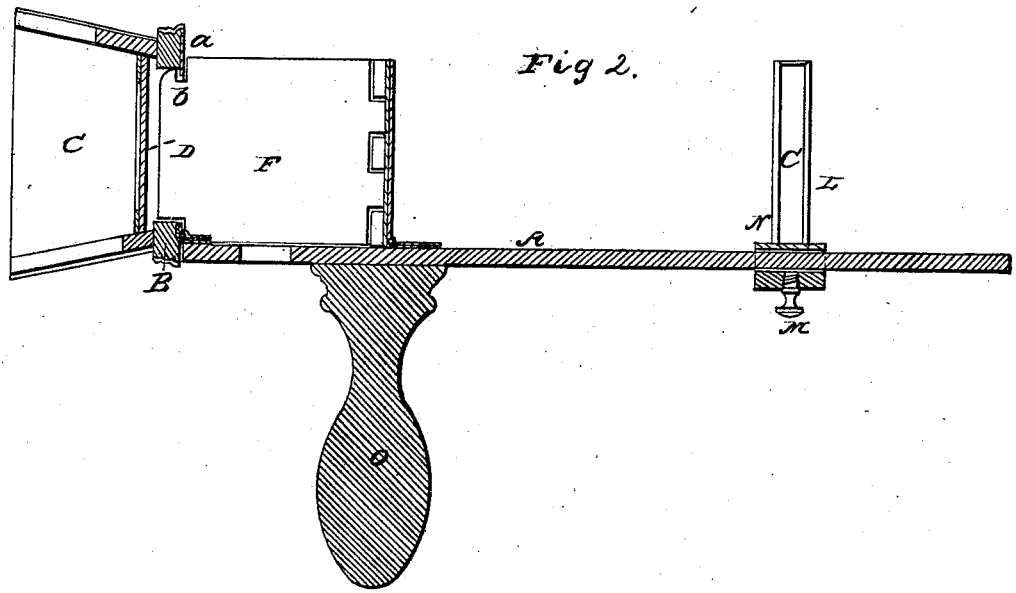
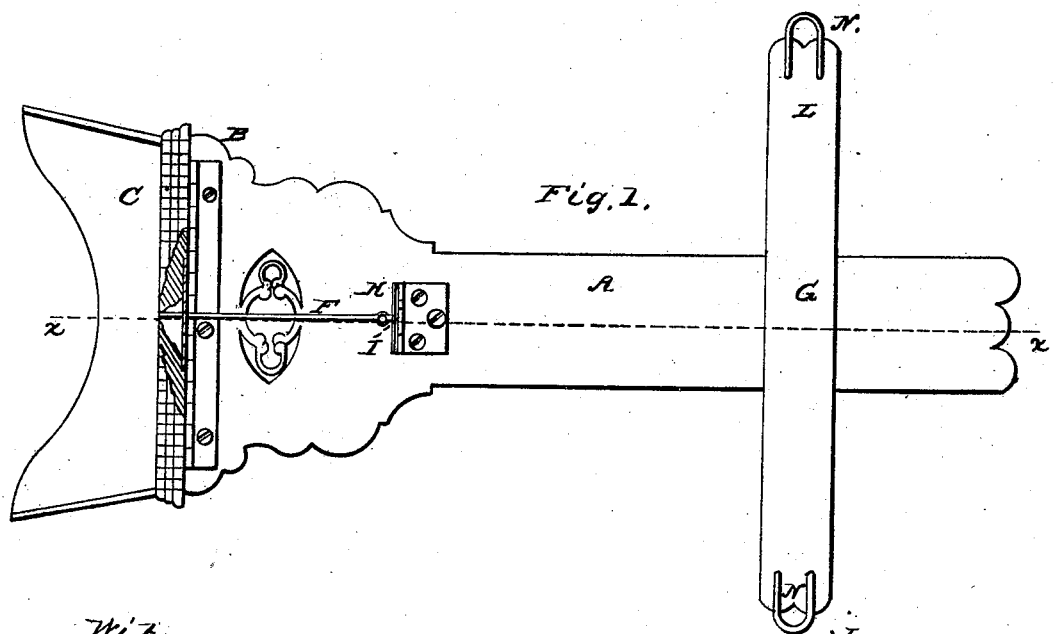

UNITED STATES PATENT OFFICE.

ANTONIO QUIROLO, OF NEW YORK, N. Y.

STEREOSCOPE.

Specification forming part of Letters Patent No. 52,744, dated February 20, 1866.

*To all whom it may concern:*

Be it known that I, ANTONIO QUIROLO, of the city, county, and State of New York, have invented new and useful Improvements in Stereoscopic Instruments; and I do hereby declare that the following is a full, clear, and exact description thereof, which will enable those skilled in the art to make and use the same.

The object of this invention is to so construct or arrange a stereoscopic instrument that when not used it can be folded up in a compact and convenient shape for being carried about the person, and when unfolded for use the picture-holder can be readily adjusted to the proper focus corresponding to the eyes of different persons; and it consists in attaching the head-piece of the instrument, or that in which the lenses are hung, to any suitable bed-plate in such a manner that when the instrument is not in use it can be swung down and upon the same, together with so attaching the diaphragm or partition-plate for the two lenses of the instrument to confine the vision of each eye to its appropriate picture to the said bed-plate that it can be folded down and upon the same, while at the same time, when the instrument is to be used, by swinging the said diaphragm up and into its proper place the holder for the lenses is securely held in an upright position thereby, the frame in which the picture is placed being arranged upon the bed-plate of the instrument in such a manner that it can be moved either toward or away from its lenses, and thus adjusted to the sight of the person using the instrument, the importance of which is obvious.

In accompanying plate of drawings my improvements in stereoscopic instruments are illustrated, Figure 1 being a plan or top view of the instrument when arranged or adjusted for use, and Fig. 2 a central longitudinal vertical section taken in the plane of the line *x x*, Fig. 1.

A in the drawings represents the bed-plate of the instrument, which may be made of wood or any other suitable material and of the requisite length, to one end, B, of which is hinged the head-piece C (containing the semi-lenses D of the instrument, made of the usual form and similarly arranged with regard to each other) in such a manner that it can be swung down and upon the said bed-plate A.

F is the diaphragm or dividing-partition of the instrument, to confine the vision of each eye to its appropriate side of the picture, extending from the contiguous edges of the lenses D toward the picture-holder G of the instrument a short distance, but sufficiently for the purpose, its outer end, H, being hinged so as to swing to the right or left to a narrow upright, I, of the bed-plate, hinged to the bed-plate and extending across the same at right angles to the said diaphragm. This diaphragm, when the instrument is to be used and its lense-holder has been swung up into position, passes under the edge *a* of its upper portion, with which it engages by its notch *b*, thus firmly holding it in position, the diaphragm, when not in use, by means of its upright I, to which it is hinged, and it in turn to the bed-plate of the instrument, swinging downward upon the said bed-plate, as is obvious without further explanation, without in the least interfering with the folding of the lens-holder upon the same.

L is the picture-holder, so arranged upon the outer end of the bed-plate of the instrument, and extending across the same at right angles, as to be susceptible of being moved toward or away from the lenses of the instrument, a set-screw, M, being used for holding it in any position desired, the picture being held in and between the two upright clasps N N at each end of the said picture-holder L.

O is a handle attached to the under side of the bed-plate so as to be detached therefrom, by which handle the instrument is taken or held when in use.

By constructing or arranging a stereoscopic instrument in the manner described it is obvious that when not in use it can be readily folded into a compact and convenient shape for being carried about the person, and yet when to be used susceptible of proper adjustment, the advantages and importance of which are obvious.

Having thus described my invention, I claim as new, and desire to secure by Letters Patent—

1. Hinging the lens-holder to the bed-plate of a stereoscopic instrument, in combination with a diaphragm, F, hinged to the said bed-plate, the two being arranged together so as to be operated and adjusted substantially in the manner described.

2. In combination with the above, the adjustable picture-holder L, arranged upon the bed-plate, as and for the purpose specified.

ANTONIO QUIROLO.

Witnesses:
ALBERT W. BROWN,
FRANCESCO PESCIŪ.